Sept. 3, 1957     R. A. DOPPLER     2,805,164
COFFEE PACKAGING AND PREPARING DEVICE
Filed Dec. 22, 1953
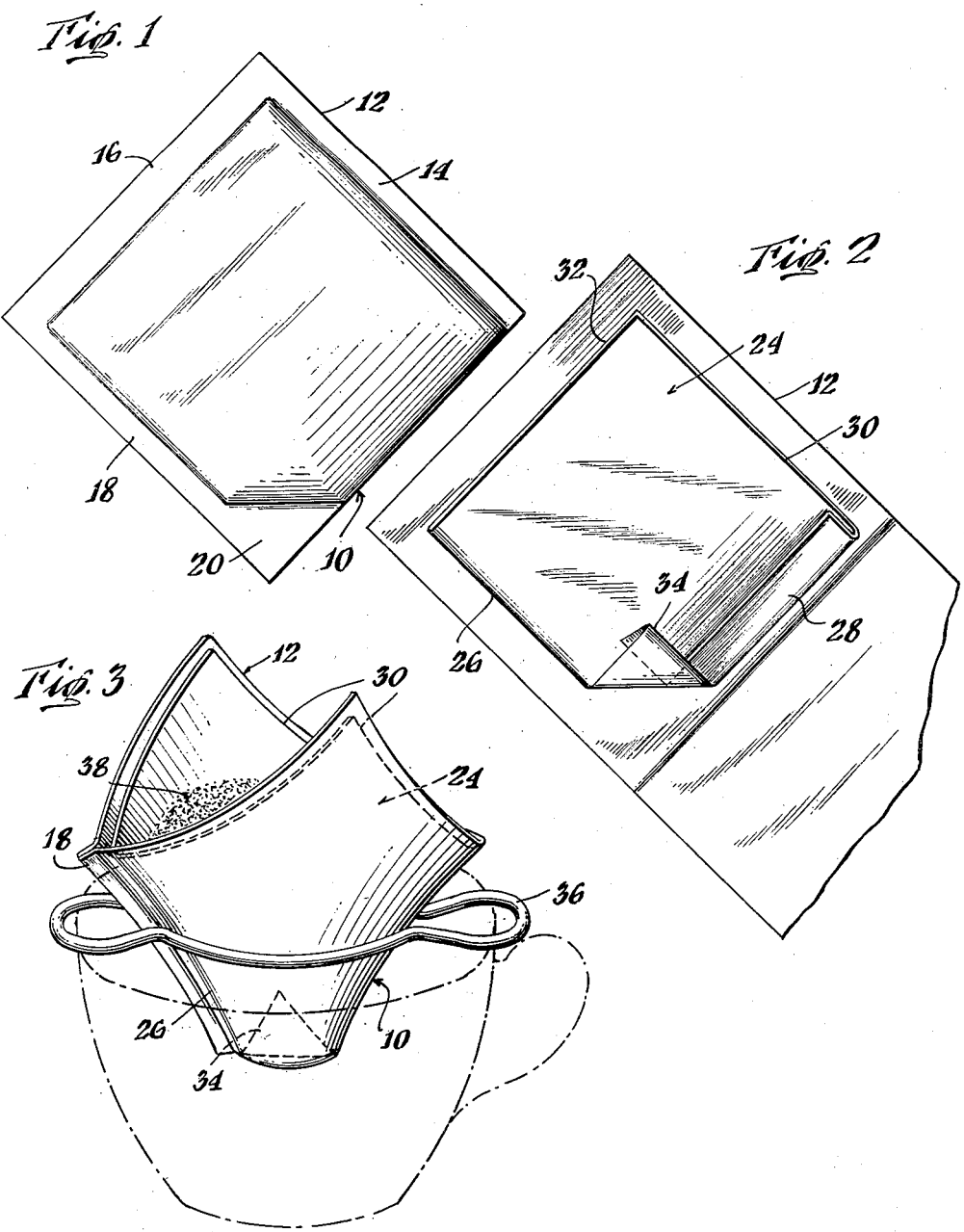
INVENTOR
Roland A. Doppler
BY
Eyre, Mann & Burrows
ATTORNEYS

United States Patent Office 2,805,164
Patented Sept. 3, 1957

2,805,164
COFFEE PACKAGING AND PREPARING DEVICE
Roland A. Doppler, New York, N. Y.
Application December 22, 1953, Serial No. 399,720
2 Claims. (Cl. 99—171)

This invention relates to a package in which finely-ground coffee bean (i. e. not dried coffee extract) can be sold ready for instant use. The package is so formed that it holds the coffee air-tight so that it will keep its original qualities even though ground, and when properly opened the container will itself serve as a filtering medium, so that for the preparation of a cup of coffee all one needs do is to pour boiling water into the container and let the liquid coffee drip out at the bottom. While I prefer to make my package with coffee in it, the packages can also be made and sold empty and the user in that case can put in his own coffee. Again, the container will act as a funnel and filtering medium and when the coffee is made the container with the residual coffee grounds can be crumpled up and readily disposed of without leaving any pot or percolator that needs to be cleaned.

This invention may be readily understood by reference to the accompanying drawings, in which—

Fig. 1 shows one of the packages embodying my invention and containing coffee;

Fig. 2 is a similar view with the top layer of foil folded back to show the interior construction; and Fig 3 shows the manner in which the device is used.

The outside of my package is formed from a layer of metal foil such as aluminum or tin foil which preferably is made in one piece and is bent along the crease line 10 to form a square 12 having foil on each face. The edges of the foil other than the bent edge formed at the crease line 10 are sealed together as indicated at 14, 16 and 18 and in one corner 20 the foil layers are pressed tightly together so that this corner may be readily identified for the purposes later described.

Between the layers of foil is a layer of filter paper shown in Fig. 2 and designated by the numeral 24. This filter paper is folded upon itself at the fold line 26 to make two sides and along one side the free edges are folded over each other to form a substantial joint as indicated at 28. The sides 30 and 32 are left with the filter paper layers separate from each other. The corner of the filter paper at the meeting point of the edges 26 and 28 is bent upward as indicated at 34 and the fact that this corner 34 is bent upward makes it possible for the layers of foil to contact each other at the corner 20. Powdered coffee in the desired amount, for example sufficient to make two cups of coffee, is put between the layers of the filter paper 24 before the package is sealed up.

As the layers of foil are tightly sealed around their edges, as by an adhesive or heat-sealing or the like, the package will be air-tight to retain the good qualities of the coffee. When the user wants to make a cup of coffee, the corner 20 is torn off just below the upturned edge of the filter paper and the two remote edges of the foil (in this case the edges 14 and 16) are torn off or separated. Pressure is then exerted to squeeze together the folded edge 10 and the sealed edge 18 and bring the package into rounded form. The package will now be in the form of a filter with the foil acting as a water-tight funnel and the inner paper layer acting as a filtering medium. Since the inner paper layer and foil layer preferably are not attached together, the pressure tending to bring the package into rounded form will also tend to cause some slight separation between the foil and the filter paper so that when filtering starts, liquid can pass through a large area of the paper and then be directed by the foil acting as a funnel. It will be noted that since the lower corner of the filter paper had been turned up as indicated at 34, this will not be torn off when the corner 20 of the foil is torn off. Thus the foil will have a bottom opening for the prepared liquid coffee to run out while the filter paper will remain substantially imperforate at the bottom. Even though the filter paper is simply folded over as indicated at 28 the pressure of the coffee and poured-in water will hold this joint against the foil to keep it sufficiently tight.

The package when brought into round form may be held in any desired manner as by one corner of the package or by a holder such as a wire ring 36 indicated in Fig. 3. Hot water is then poured slowly over the coffee indicated at 38 in Fig. 3 and allowed to drip out of the bottom where the corner 20 of the foil had been torn off. After the liquid has drained out, the whole package may be crumpled up and disposed of with the grounds still inside it.

If it is desired to use the package merely as a simple coffee-making equipment, the flat packages without contained coffee can be sold. In such case the edges 14 and 16 need not be sealed and the corners 20 may be torn off in advance or left for the user to tear off. In this case the user will bring the device into rounded form and then put in the appropriate amount of ground coffee before pouring the boiling water over it.

This arrangement will be found very simple and efficient, and the form where the contained coffee is shipped in the package will be found particularly efficient for travellers who can readily get boiling water or bring water to the boiling point with an electrical device and then simply open one of these packages and pour the water through. With the package of this invention, making coffee is almost as simple as using instant coffee (dried coffee extract) and has the advantage that the prepared cup of coffee has all the aroma and flavor of coffee made directly from the ground bean.

While I prefer to use foil of the outside layer, other waterproof sheeted material may be used such as waterproofed paper or polyethylene.

What I claim is:

1. A coffee package comprising two layers of metal foil of rectangular shape sealed at their four edges, two layers of filter paper between the layers of foil joined along two adjacent edges and with the point between such joined edges turned back so that if the corresponding corner of the foil is torn off such corner of the filter paper will not be torn, and ground coffee between the layers of filter paper, so that if the corner of the foil corresponding to the turned-up corner of the filter paper is torn off and the two opposite edges of the foil are opened, a metallic funnel will be formed lined with filter paper holding coffee ready to be brewed by pouring hot water through it.

2. A coffee package comprising two layers of approximately waterproof material sealed at their edges to form a closed package, filtering material between the said waterproof layers holding ground coffee and to be supported by said waterproof material but independent of said waterproof material at at least one space whereby said waterproof material may be perforated at such space without perforating the filtering material so that if said sealed package is opened at an area opposite said space to be perforated the structure will act as a filtering device for making coffee and holding the coffee grounds.

References Cited in the file of this patent
UNITED STATES PATENTS

| | | |
|---|---|---|
| 975,874 | Korn et al. | Nov. 15, 1910 |
| 2,192,605 | Salfisberg | Mar. 5, 1940 |
| 2,273,422 | Shroeder | Feb. 17, 1942 |
| 2,377,118 | Weisman | May 29, 1945 |